(12) United States Patent
Liu et al.

(10) Patent No.: US 12,054,620 B2
(45) Date of Patent: *Aug. 6, 2024

(54) ENERGY CURABLE, HEAT ACTIVATED FLEXOGRAPHIC ADHESIVES FOR DIE-LESS FOILING

(71) Applicant: INX International Ink Co., Schaumburg, IL (US)

(72) Inventors: Xiang Jun Liu, Schaumburg, IL (US); Jonathan B. Graunke, South Elgin, IL (US); Eli J. Kendra, Schaumburg, IL (US); Stephen B. Mitchell, Schaumburg, IL (US)

(73) Assignee: INX INTERNATIONAL INK CO., Schaumburg, IL (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/520,410

(22) Filed: Nov. 5, 2021

(65) Prior Publication Data

US 2022/0056288 A1 Feb. 24, 2022

Related U.S. Application Data

(60) Continuation-in-part of application No. 17/151,949, filed on Jan. 19, 2021, now Pat. No. 11,518,895, which is a division of application No. 16/018,875, filed on Jun. 26, 2018, now Pat. No. 10,927,269.

(60) Provisional application No. 63/110,700, filed on Nov. 6, 2020, provisional application No. 62/525,507, filed on Jun. 27, 2017.

(51) Int. Cl.
| | |
|---|---|
| *C08F 2/46* | (2006.01) |
| *C08F 2/50* | (2006.01) |
| *C08G 61/04* | (2006.01) |
| *C09D 11/10* | (2014.01) |
| *C09D 11/101* | (2014.01) |
| *C09J 133/08* | (2006.01) |
| *C09J 133/10* | (2006.01) |
| *C09J 133/14* | (2006.01) |

(52) U.S. Cl.
CPC ............ *C09D 11/101* (2013.01); *C09D 11/10* (2013.01); *C09J 133/08* (2013.01); *C09J 133/10* (2013.01); *C09J 133/14* (2013.01); *C08L 2312/00* (2013.01)

(58) Field of Classification Search
CPC ...... C09J 133/08; C09J 133/10; C09J 133/14; C09J 4/06; C09J 151/08; C08F 265/06; C08F 290/067; C08F 220/1811; C08F 220/1806; C09D 11/101; C09D 11/10; C08L 2312/00
USPC ................................................ 522/1; 520/1
See application file for complete search history.

(56) References Cited

U.S. PATENT DOCUMENTS

| | | | |
|---|---|---|---|
| 6,395,120 B1 | 5/2002 | Bradbury-Harris et al. | |
| 6,509,128 B1 | 1/2003 | Everaerts et al. | |
| 6,624,273 B1 | 9/2003 | Everaerts et al. | |
| 6,974,850 B2 | 12/2005 | McMan et al. | |
| 7,067,584 B2 | 6/2006 | Rink et al. | |
| 7,204,588 B2 | 4/2007 | Takabayashi | |
| 7,507,776 B2 | 3/2009 | McMan et al. | |
| 7,754,779 B2 | 7/2010 | Odell et al. | |
| 7,959,279 B2 | 6/2011 | Nakamura | |
| 8,133,551 B2 | 3/2012 | Claes | |
| 9,346,303 B2 | 5/2016 | Grinberg et al. | |
| 9,487,027 B1 | 11/2016 | Strater, Jr. et al. | |
| 10,927,269 B2 | 2/2021 | Graunke et al. | |
| 2002/0128340 A1 | 9/2002 | Young et al. | |
| 2003/0054139 A1 | 3/2003 | Ylitalo et al. | |
| 2007/0219285 A1 | 9/2007 | Kropp et al. | |
| 2008/0299317 A1 | 12/2008 | Hable | |
| 2009/0181182 A1 | 7/2009 | Sloan | |
| 2010/0212821 A1 | 8/2010 | Grinberg et al. | |
| 2011/0223391 A1 | 9/2011 | Nishimura et al. | |
| 2012/0070595 A1 | 3/2012 | Sloat et al. | |
| 2013/0075040 A1 | 3/2013 | Grinberg et al. | |
| 2014/0109828 A1 | 4/2014 | Grinberg | |
| 2016/0137857 A1* | 5/2016 | Zhang .................... | B41M 1/40 522/18 |
| 2018/0163066 A1 | 6/2018 | Ward | |
| 2018/0311997 A1 | 11/2018 | Triepel et al. | |

(Continued)

FOREIGN PATENT DOCUMENTS

| | | |
|---|---|---|
| CN | 102199377 A | 9/2011 |
| EP | 0193726 A2 | 9/1986 |
| GB | 1590414 A | 6/1981 |

(Continued)

OTHER PUBLICATIONS

Japan Patent Office. Office action for Application No. 2019-572528 dated Mar. 8, 2022, (13 pages with translation).
Japan Patent Office. Office action for Application No. 2019-572528 dated Dec. 20, 2022, (15 pages with translation).
Datta et al., "Conductive Adhesives From Low-VOC Silver Inks for Advanced Microelectronics Applications," in IEEE Transactions on Components, Packaging and Manufacturing Technology, vol. 1, No. 1, pp. 69-75, Jan. 2011.
European Patent Office Extended Search Report for Application No. 18824065.9 dated Feb. 22, 2021 (10 pages).
International Search Report and Written Opinion for Application No. PCT/US2018/039505 dated Oct. 19, 2018 (17 pages).

(Continued)

*Primary Examiner* — Jessica Whiteley
(74) *Attorney, Agent, or Firm* — Michael Best & Friedrich LLP

(57) ABSTRACT

Adhesive compositions disclosed herein can be applied to substrates using flexo-printing (via, e.g., photopolymer plate); cured to a hardened, tack-free state; and readily be rendered tacky on application of heat and pressure to accurately transfer foil to the substrates. An example adhesive composition includes a monomer component, an oligomer/resin component including one or more oligomers and one or more inert thermoplastic resins that are soluble in the monomers, and, where required, one or more free radical polymerization initiators.

18 Claims, No Drawings

(56) References Cited

U.S. PATENT DOCUMENTS

| | | |
|---|---|---|
| 2018/0319136 A1 | 11/2018 | Cohen et al. |
| 2020/0216691 A1 | 7/2020 | Gould |

FOREIGN PATENT DOCUMENTS

| | | |
|---|---|---|
| JP | H05320582 A | 12/1993 |
| JP | 2002069388 A | 3/2002 |
| JP | 2003326846 A | 11/2003 |
| JP | 2008169319 A | 7/2008 |
| JP | 2009024139 A | 2/2009 |
| JP | 2009226880 A | 10/2009 |
| JP | 2014177023 A | 9/2014 |
| WO | 0234521 A1 | 5/2002 |
| WO | 2011021052 A2 | 2/2011 |

OTHER PUBLICATIONS

International Preliminary Report on Patentability for Application No. PCT/US2018/039505 dated Jan. 9, 2020 (10 pages).
Canadian Patent Office. Office Action for Application No. 3068450, dated Jan. 11, 2024 (6 pages).

\* cited by examiner

ENERGY CURABLE, HEAT ACTIVATED FLEXOGRAPHIC ADHESIVES FOR DIE-LESS FOILING

CROSS-REFERENCE TO RELATED APPLICATIONS

This application is a continuation-in-part of U.S. patent application Ser. No. 17/151,949 filed Jan. 19, 2021, which is a divisional application of U.S. patent application Ser. No. 16/018,875 filed Jun. 26, 2018, which claims the benefit of priority to U.S. Provisional Patent Application No. 62/525,507 filed Jun. 27, 2017, each of which is incorporated herein by reference in its entirety. This application also claims priority to U.S. Provisional Patent Application No. 63/110,700 filed Nov. 6, 2020, which is incorporated herein by reference in its entirety.

FIELD OF PRESENT DISCLOSURE

The present disclosure relates to an energy curable flexographic adhesive composition comprising inert resins, oligomers, monomers, and other functional additives. The adhesive can be applied to substrates including, inter alia, paper, carton board, and plastic films. Upon exposure to one of UV, LED, or electronic beam (EB) radiation, the adhesive is fully hardened and has a tack-free surface. The hardened adhesive surface will become tacky upon exposure to heat and pressure. When a foil (either cold foil or hot foil) is applied to the tacky surface of the hardened adhesive, die-less foil transfer can be efficiently and accurately implemented.

BACKGROUND

Cold foiling and hot foiling (hot stamping) are the techniques commonly used in metallic foil decoration of various substrates.

Cold Foiling

The basic steps involved in cold foiling are: (1) Apply adhesive to the substrate in a desired image configuration; and (2) Press together foil on a backing carrier and the substrate to release the foil from its backing carrier onto the substrate wherever the adhesive image configuration was printed and (3) strip away the foil from areas where no adhesive was printed.

The cold foiling operation can only be conducted through an in-line process by means of offset printing, letterpress printing, inkjet printing, and flexographic printing. Cold foiling cannot be conducted off-line with the above printing routes because the tackiness and softness of the adhesive image configuration applied to the substrate makes storage and transport of the substrate to a printing facility impractical and undesirable.

The UV offset (lithographic) and UV flexographic in-line cold foiling become more popular in converting industry. A great number of the UV offset in-line cold foiling and the UV flexographic in-line cold foiling are implemented either by a "first nip/then curing" process or by a "first curing/then nip" process, respectively, due to the viscosity and tack characteristics of the corresponding inks. The "nip" here means the foil is in touch with the adhesive-bearing substrate under a given pressure generated by the impression rollers. The "cure" means the crosslinking or polymerization occurs to the adhesive when it is exposed to the UV light or other radiation sources.

The flexographic route, however, appears to face more challenges in implementing the "first curing/then nip" in-line cold foiling process as it requires a specific configuration for the press build-up. The in-line foiling process generally won't allow the use of the presses that contain any turner bars or rotating rollers in the pathway between a UV curing station and a foiling station as this, during the cold foiling process, would result in the adhesive (which was partially cured) being transferred to these elements. If the adhesive is completely cured, it cannot be reactivated to provide necessary tackiness.

The UV flexographic or UV offset cold foiling can be a cost-effective choice for printing jobs that have large foil area. The large foil area needed on the accepting sheet will allow maximum use of the foil ribbon. If the foil area (the area on the sheet that will be foiled) is small, however, there may be an excessive amount of waste of foil not being applied, as the cold foiling process generally doesn't allow for indexing of foil. It won't make full use of the entire foil ribbon over the accepting sheet. In such a case, hot stamping (hot foiling) can be a better option for foiling application.

Hot Foiling

Hot foiling is another technique used in applying metallic foil decoration onto various substrates. Hot foiling, which is also referred to as hot stamping, is traditionally accomplished on a foil stamping machine that uses a metal plate/die that has been engraved with an image of the designed pattern.

The hot foil web material that can be used in this process is well known and widely available. It generally comprises a polyester or other plastic backing film with a wax layer, a lacquer layer, a foil layer and an adhesive layer lying over the foil layer. The adhesive layer lying over the foil layer is positioned opposite the adhesive image configuration laid down on the substrate to which the foil is to be applied.

In hot-stamping operation, a heated die or a roller is used to apply pressure to a foil and force the required portion of foil into contact with the substrate. The die/roller itself can be engraved from brass, steel, or silicone rubber. The combination of pressure and heat soften the substrate and activate the foil release layer, generating a strong bond in the interface between the foil and the accepting substrate. When the foil is pulled away, only the areas subjected to the hot stamp remain affixed to the substrate. The carrier layer of foil can be readily removed from the printed surface through a rewinding operation.

Hot-stamping can be applied to many different materials like paper, polyester or clear films through either an off-line process or an in-line process. Hot stamping allows for the foil ribbon to precisely index in small increments and thus maximize the use of the entire foil ribbon. Hot stamping is typically better for text or shapes and minimal designs. It can be combined with embossing/debossing to produce a tactile effect, which cannot be done with cold foil. It is preferred by many converters who are looking for a clean, professional finish.

When hot foiling technique is applied, the foil pattern transferred to the substrate is dictated by the design engraved into the metal die. It may take several days or even weeks to engrave a die with the required design, and to mount the die onto the printing unit ready for stamping the foil onto the substrate. The die engraving process is very expensive, and this is particularly true for short run jobs where each of the runs may need a new imaging design. High pressure and temperature are required and it is difficult to maintain proper registration and fine resolutions in hot stamping.

Thus, there is also a need to overcome the disadvantages relating to the use of hot stamping.

SUMMARY

In one aspect, the disclosure provides a method of transferring foil to a substrate in an image pattern. The method includes providing a foil bearing web; providing a substrate for receiving foil from the web; applying an adhesive composition to the substrate in an image pattern through a flexographic printing process, applying UV, LED, or EB radiation to the image pattern to cure the adhesive composition to a hardened, and tack-free state; and positioning the substrate bearing the cured image pattern against the foil of the foil bearing web and applying heat and pressure to render the adhesive composition tacky and transfer foil onto the image pattern. In addition, the adhesive composition includes a monomer component including one or more free-radical curing monofunctional monomers; an oligomer/resin component including one or more oligomers, one or more inert thermoplastic resins, or a combination thereof, the oligomer/resin component being soluble in the one or more monofunctional monomers; and optionally one or more functional additives for curing the one or more monofunctional monomers upon exposure to UV, LED, or EB radiation.

In another aspect, the disclosure provides an adhesive composition that includes about 20% to about 70% of a monomer component (by weight of the adhesive composition), the monomer component including one or more free-radical curing monofunctional monomers and including bifunctional and/or trifunctional free-radical curing monomers at a level of no more than about 3% by weight of the monomer component. The adhesive composition includes about 10% to about 60% of an oligomer/resin component (by weight of the adhesive composition), the oligomer/resin component including one or more oligomers, one or more inert thermoplastic resins, or a combination thereof, the oligomer/resin component being soluble in the one or more monofunctional monomers. The adhesive composition also optionally includes one or more functional additives for curing the one or more free-radical curing monofunctional monomers upon exposure to UV, LED, or EB radiation. The adhesive composition forms a hardened tack-free solid at room temperature when cured upon exposure to UV, LED, or EB radiation, and the cured adhesive composition is rendered tacky upon exposure to heat and pressure.

The unique adhesive composition embodiments of the present disclosure can be readily applied to substrates through flexo printing, fully cured to a hardened, tack-free, dry-to-the-touch and moisture resistant state and then, when desired, readily rendered tacky on application of heat and pressure to accurately transfer foil to the substrates. These unique adhesive composition embodiments thereby make convenient, efficient, precise and reliable die-less hot foiling techniques possible by using flexo photopolymer plate to apply the adhesive in desired image configurations.

Embodiments of the present disclosure address challenges in prior art cold foiling and hot stamping systems.

Embodiments of the disclosure comprise a foil printing system employing adhesive compositions applied to a substrate in a desired adhesive image configuration using the flexographic printing process. The substrate may be paper, carton board, plastic film (e.g., polypropylene or polyethylene) and other substrates used in contact printing processes.

After embodiments of the adhesive composition are applied to the substrate in the desired image configuration, the image is cured to a hardened, tack-free, dry-to-the-touch and moisture resistant state by exposure to UV or LED radiation, or by electron-beam ("EB") ionizing radiation. Application of the UV, LED, or EB radiation to the image nearly instantly transforms the adhesive composition from a liquid to a hardened tack-free solid at room temperature. No further curing of the hardened adhesive composition image configuration is required or occurs in this system.

Monomer Component

Adhesive composition embodiments of the present disclosure have the unique characteristic of being able to fully cure and harden upon exposure to UV, LED or EB radiation yet soften along their exposed surface and take on sufficiently adhesive surface characteristics for proper foil transfer when heating and pressure are applied during the foiling process.

In order to achieve the unique characteristic of being able to fully cure and harden upon exposure to UV, LED or EB radiation yet soften along the exposed surface of the applied adhesive image and take on sufficiently adhesive surface characteristics for proper foil transfer upon application of heat and pressure, it is necessary that the monomer component of the composition be purely or primarily radiation-curable monofunctional monomers, that the level of any bifunctional or trifunctional monomers present be carefully limited, and that other multi-functional monomers (greater than trifunctional monomers) be excluded from the composition.

More particularly, the level of bifunctional and/or trifunctional radiation-curable monomers must be no more than about 10% by weight of the monomer component of the composition and preferably no more than about 5% by weight of the monomer component, with the balance being one or more radiation-curable monofunctional monomers. Additionally, the low functionality free-radical curing monomer(s) must be able to solubilize the inert resin component of the composition, that is, the inert resin component must be soluble in the monomer.

Oligomer/Resin Component

This component of the composition may comprise exclusively one or more oligomers, exclusively one or more inert thermoplastic resins, or a combination of one or more oligomers and one or more inert thermoplastic resins. "Inert thermoplastic resins" are thermoplastic resins that do not polymerize when subjected to UV, LED or EB radiation. The inert thermoplastic resin(s) and oligomer(s) used may be up to 100% solids and desirably have a glass transition temperature $T_g$ of the oligomer(s) and resin(s) within 40% and preferably within 10% of the glass transition temperature of the low functionality free-radical curing monomer used. In less preferred embodiments inert thermoplastic resins and oligomers outside of this glass transition temperature may be used, so long as the $T_g$ of the final adhesive composition is in the range of about 20° C. to about 100° C. and preferably about 40° C. to about 80° C.

Additionally, in order to achieve unique hardening and ability to soften along the image surface, it is further required that the glass transition temperature $T_g$ of the oligomers and/or resins be about −40° to about 300° C. and their softening point should be about 0° to about 190° C. and preferably about 60° to about 120° C.

Free Radical Photoinitiator

A free radical photoinitiator is required to achieve free radical curing of the UV and LED cured compositions but is not required for the EB cured compositions.

One objective of embodiments of the present disclosure is to provide adhesive composition embodiments that are curable by the application of EB curing technology and do not require the use of photoinitiators. EB cured adhesive compositions are preferred in many applications because they generally produce less odor than UV/LED cured compositions, can be used to generate thicker coatings and raised images, and produce superior visual quality images from transferred foil. EB curable heat activated adhesive embodiments are also particularly well-suited for use in food, pharmaceutical, and personal care packaging in both cold and hot foiling processes.

The photoinitiators used for UV curable adhesives should absorb radiation in the actinic wave bands (e.g., 220-410 nm) that are generated by conventional mercury UV lamps.

The photoinitiators used for LED curable adhesives should absorb the longer actinic wave bands (e.g., 395 nm, 365 nm) that are emitted by LED lamps.

Surface Tension and Viscosity of Adhesive Compositions

Preferably, embodiments of the adhesive compositions will have a surface tension at 25° C. from about 22 mN/m to about 34 mN/m, preferably from about 25 mN/m to about 32 mN/m, and more preferably from about 28 mN/m to about 30 mN/m. Preferably, embodiments will also have a viscosity at 25° C. between about 100 cps and about 3000 cps, preferably between about 400 cps and about 2000 cps, and more preferably between about 600 cps and about 1200 cps.

Embodiments of the UV curable and the LED curable flexo heat activated adhesives can comprise:
(1) 0-30% of inert resins;
(2) 0-30% of low functionality oligomers;
(3) 20-70% of mono-functional monomers;
(4) 0-10% of di-functional monomers;
(5) 0-10% of tri-functional monomers;
(6) 1-20% of photoinitiators;
(7) 0-20% of amine synergists;
(8) 0.01-2.5% of defoamers;
(9) 0.01-5.0% of wetting, flow agents;
(10) 0-3% wax additives; and
(11) 0.05-3.0% stabilizers.

Embodiments of EB curable flexo heat activated adhesives can comprise:
(1) 0-30% of inert resins;
(2) 0-30% of low functionality oligomers;
(3) 20-70% of mono-functional monomers;
(4) 0-10% of di-functional monomers;
(5) 0-10% of tri-functional monomers;
(6) 0-20% of amine synergists;
(7) 0.01-2.5% of defoamers;
(8) 0.01-5.0% of wetting, flow agents;
(9) 0-3% wax additives; and
(10) 0.05-3.0% of stabilizers.

DETAILED DESCRIPTION

It is to be understood that the foregoing general description and the following detailed description are exemplary and explanatory only, and are not intended to restrict the subject matter claimed or protected herein.

Unless defined otherwise, all technical and scientific terms used herein have the same meaning as is commonly understood by one of skill in the art to which the present disclosure belongs.

As used herein, "monomer" refers to a material having a viscosity less than that of an oligomer, molecular weight less than about 1000 g/mole and viscosity of 500 cps or less at 25° C. The monomers contain one or more unsaturated groups capable of polymerizing to form oligomers or polymers.

As used herein, the term "monofunctional acrylate monomer" refers to a monomer containing one functional acrylate group or one double bond.

As used herein, the term "difunctional acrylate monomer" refers to a monomer containing two functional acrylate groups or two double bonds.

As used herein, the term "trifunctional acrylate monomer" refers to a monomer containing three functional acrylate groups or three double bonds.

As used herein, the term "high functionality acrylate monomer" refers to an acrylate monomer containing greater than three functional acrylate groups or three double bonds.

As used herein, the terms "(meth) acrylate" and "(meth) acrylic acid" include both the acrylate compounds and methacrylate compounds.

As used herein, the term "ethoxylated" refers to chain extended compounds through the use of ethylene oxide.

As used herein, the term "propoxylated" refers to chain extended compounds through the use or propylene oxide.

As used herein, the term "alkoxylated" refers to chain extended compounds using either or both ethylene oxide and propylene oxide.

As used herein, "oligomer" refers to a material having a viscosity greater than that of a monomer, a molecular weight of about 5000 g/mole to 200,000 g/mole and having one or more unsaturated groups, are capable of polymerizing to form polymers with higher molecular weight. "Functional oligomers" are oligomers as described above that will dissolve in the monomers employed in embodiments of the present disclosure, will cure rapidly on application of UV, LED or EB radiation, are flexible after being cured, and provide tackiness when heated after being cured.

As used herein, the term "molecular weight" means number average molecular weight unless expressly noted otherwise.

As used herein, "polymer" refers to a macromolecule that has a molecular structure consisting chiefly or entirely of a large number of similar units bonded together.

As used herein, the term "inert resin" refers to a resin that contains no C=C bond or other reactive groups and which does not react with monomers/oligomers even if exposed to UV, LED, or EB radiation.

As used herein, the term "thermoplastic resin" refers to a plastic material, or a polymer, that becomes pliable or moldable above a specific temperature and solidifies upon cooling.

As used herein, "energy curable" refers to curing in response to exposure to suitable energy sources including ultraviolet (UV) radiation, light emitting diode (LED) radiation, and electron beam radiation.

As used herein, "cure" or "curing" refers to a process that leads to polymerizing, hardening and/or crosslinking of monomer and/or oligomer units to form a polymer.

As used herein, the term "room temperature" refers to an ambient temperature of 23° C. to 25° C.

As used herein, "heat activatable or heat activated" refers to an activity of a cured resin or cured adhesive in response to its exposure to heat and pressure.

As used herein, the term "coat weight" refers to amount of adhesive applied on a given side or surface of a substrate. This may be usually expressed in grams of the composition per square meter of the substrate ("gsm").

As used herein, the term "in-line" refers to a foiling system in which the printing station and the foiling station are separate commonly driven units horizontally mounted one to the other.

As used herein, the term "off-line" refers to a foiling system in which the printing station and foiling stations are separate units mounted in different locations or horizontally mounted one to the other which are not commonly driven or operated.

Throughout this disclosure, all parts and percentages are by weight (wt % based on total weight) and all temperatures are in degrees C. unless otherwise specified.

Energy Curable, Heat Activated Flexographic Adhesives

The major components included in the free radical-based energy curable, hot activated flexographic adhesive are inert resins, oligomers, monomers, and other functional additives described below.

Inert Resins

The resins used in adhesive composition embodiments are inert in that they do not react with monomers or oligomers in the composition embodiments. These carefully selected inert thermoplastic resins also contribute to film flexibility and reduce film shrinkage during the curing process, improve surface softening, tackiness and adhesion, and help the cured adhesive compositions firmly adhere to the substrate. Thermosetting resins may not be used.

The inert resins may be selected from among acrylic resins, methacrylic resins, acrylate resins, methacrylate resins, urea aldehyde resins, rosin ester resins, cellulose resins, polyester resins, aldehyde resins, epoxy resins, vinyl chloride copolymers, melamine-formaldehyde resins, polyurethane resins, polyimide resins, alkyd resins, and phthalate resins. Methacrylic resins are currently preferred. The inert resins may have a molecular weight in the range of about 2,000 g/mole to about 300,000 g/mole, and preferably in the range of about 10,000 g/mole to about 200,000 g/mole.

Acrylic, methacrylic, acrylate and methacrylate resins that may be used include Elvacite 2008 (Ineos acrylics with a molecular weight of 37,000, Tg 111° C.), Elvacite 2014 (Ineos acrylics with a molecular weight of 119,000, Tg 41° C.), Elvacite 2028 (Ineos acrylics with a molecular weight of 59,000, Tg 45° C.), Elvacite 2044 (Ineos acrylics with a molecular weight of 142,000, Tg 20° C.), Elvacite 2046 (Ineos acrylics with a molecular weight of 165,000, Tg 35° C.), Elvacite 2550 (Ineos acrylics with a molecular weight of 98,000, Tg 36° C.), Elvacite 2697 (Ineos acrylics with a molecular weight of 50,000, Tg 60° C.), Elvacite 2927(Ineos acrylics with a molecular weight of 19,000, Tg 46° C.), Elvacite 4026 (Ineos acrylics with a molecular weight of 32,500, Tg 75° C.), Elvacite 4044 (Ineos acrylics with a molecular weight of 12,000, Tg 32° C.), Elvacite 4059 (Ineos acrylics with a molecular weight of 20,500, Tg 40° C.), Elvacite 4402 (Ineos acrylics with a molecular weight of 40,000, Tg 76° C.), Elvacite 4331(Ineos acrylics with a molecular weight of 4,000, Tg 71° C.), Elvacite 4036 (Ineos acrylics with a molecular weight of 60,000, Tg 50° C.), Elvacite 2013 (methyl methacrylate/n-butyl methacrylate copolymer with a molecular weight of 34,000, Tg 76° C.), Elvacite 2043 (ethyl methacrylate copolymer with a molecular weight of 50,000, Tg 66° C.) from Lucite, Neocryl B-819 (acrylic/styrene copolymer with a molecular weight of 50,000, Tg 55° C.), NeoCryl B735 (methyl methacrylate copolymer with a molecular weight of 40,000, Tg 74° C.), NeoCryl B300 (1\4\4A/BMA copolymer with a molecular weight of 16,000, Tg 45° C.), and NeoCryl B302 (MMA copolymer with a molecular weight of 5,000, Tg 80° C.) from DMS, DianalMB-2876 (acrylic bead resin with hydroxyl (OH) functional groups with a molecular weight of 30,000, Tg 81.5° C.), DianalMB-2935 (acrylic bead resin with hydroxyl (OH) functional groups with a molecular weight of 22,000, Tg 82° C.), DianalMB-2998 (harder styrene acrylic resin with a molecular weight of unspecified, Tg 82° C.), Dianal BR-57 (higher solids styrene acrylic resin with a molecular weight of 45,000, Tg 59.5° C.), Dianal BR-87 (thermoplastic acrylic resin with a molecular weight of 25,000, Tg 97.5° C.), Dianal BR 106 (n-butyl methacrylate copolymer with a molecular weight of 60,000, Tg 60° C.), Dianal MB-2594 (thermoplastic acrylic resin with a molecular weight of 7,000, Tg 58.5° C.) from DAI, Degalan P24 (methacrylic resin with a molecular weight of 180,000, Tg 43° C.), Degalan PM602 (methacrylic resin with a molecular weight of 64,000, Tg 62° C.), Degalan PM685 (methacrylic resin with a molecular weight of 60,000, Tg 64° C.), Degalan PQ611(methacrylic resin with a molecular weight of 120,000, Tg 31° C.), Degalan 64/12 (methacrylic resin with a molecular weight of 68,000, Tg 58° C.), Degalan PM381N (methacrylic resin with a molecular weight of 65,000, Tg 57° C.), Degalan LP66/02 (methacrylic resin with a molecular weight of 60,000, Tg 82° C.), Degalan M825 (methacrylic resin with a molecular weight of 80,000, Tg 105° C.), Degalan LP53/13 (methacrylic resin with a molecular weight of 96,000, Tg 112° C.) from Evonic, Paraloid DM-55 (methyl methacrylate copolymer with a molecular weight of 6,000, Tg 70° C.), Paraloid B-48N (solid grade thermoplastic acrylic resin with a molecular weight of unspecified, Tg 50° C.), Paraloid B44 (MMA/EA copolymer with a molecular weight of 140,000, Tg 60° C.) from Dow, Ebecryl 168 (acidic methacrylate copolymer, Mt and Tg unspecified), Ebecryl 170 (acidic methacrylate copolymer, Mt and Tg unspecified), Ebecryl 745 (acrylic polymer, Mt unspecified, Tg 30° C.) from Allnex, and LUMICRYL 1000 (acrylic resin, Mt and Tg unspecified) from Estron Chemical.

Aldehyde resins that may be used include Reactol 1717 (aldehyde resin having a melting point of 100° C.), Reactol 1979 (aldehyde resin having a softening point of 85° C.) from Lawter, Laropal A 81 (aldehyde resin having a Tg of 57° C.) Laropal A 101 (aldehyde resin having a Tg of 73° C.) from BASF, Variplus CA resin (ketone-aldehyde condensation resin having a Tg of 70° C.) and SK resin (a hydrogenated acetophenone-folmaldehyde resin having a Tg of 90° C.) from Evonic.

Vinyl resins that may be used include Vinnol E15/48A (hydroxyl-containing copolymer of approx. 84 wt. % vinyl chloride (VC) and approx. 16 wt. % of acrylic acid esters), Vinnol H15/45M 48H (terpolymer of approx. 84 wt. % vinyl chloride (VC), approx. 15 wt. % vinyl acetate (VAc) and approx. 1 wt. % dicarboxylic acid). Vinnol H30/48M (a carboxylate-containing terpolymer of approx. 70 wt. % vinyl chloride (VC), approx. 29 wt. % vinyl acetate (VAc) and approx. 1 wt. % dicarboxylic acid), Vinnol H40/43 (copolymer of approx. 66 wt. % vinyl chloride (VC) and approx. 34 wt. % of vinyl acetate (VAc), Vinnol H40/50 (copolymer of approx. 63 wt. % vinyl chloride (VC) and approx. 37 wt. % of vinyl acetate (VAc) from Wacker, Elvax 210W (ethylene vinyl acetate copolymer, melting point 60° C.), Elvax 220W (ethylene vinyl acetate copolymer, melting point 70° C.), Elvax 240W (ethylene vinyl acetate copolymer, melting point 74° C.), Elvax 40W (ethylene vinyl acetate copolymer, melting point 47° C.), Elvax 410 (ethylene vinyl acetate copolymer, melting point 73° C.), Elvax 420 (ethylene vinyl acetate copolymer, melting point 73° C.), Elvax 4310 (ethylene vinyl acetate copolymer, melting point 66° C.), ELVAX 150 (ethylene vinyl acetate copolymer, melting point 63° C.), ELVAX 40L-03 (ethylene vinyl acetate copolymer, melting point 58° C.), ELVAX CE9619-1 (ethylene vinyl acetate copolymer, melting point 87° C.) from DuPont, and VYHH (with a molecular weight of 27,000, Tg 72° C.), VMCC (with a molecular weight of 19,000, Tg 72° C.), VWCH (with a molecular weight of 27,000, Tg 74° C.) from Dow.

Rosin ester resins that may be used include Filtrez 521 (fumaric modified rosin ester, Mt unspecified, Tg 98° C.), Filtrez 531(fumaric modified rosin ester, Mt unspecified, Tg 105° C.), and Filtrez 526 (fumaric acid modified rosin ester, Mt unspecified, Tg 72° C.), Filtrez 629 (phenolic modified rosin ester, Mt unspecified, melting point 155° C.) from Akzo, and Syvatec RE 40 (Mt and Tg unspecified) from Arizona Chemical.

Polyester resins that may be used include Dynapol LS 411 (with a molecular weight 16000, Tg 47° C.), Dynapol LS 651 (with a molecular weight 15000, Tg 40° C.), Dynapol LS 415 (with a molecular weight 25000, Tg 12° C.) from Evonic, Reactol 1979 (a hydroxyl functional polyester with a softening point of 85° C.), Reactol-5145 (a highly structured, flexible polyester resin with a melting point of 127° C.) from Lawter.

Cellulose-based resins that may be used include CAB551-0.01 (Cellulose Acetate Butyrate with a molecular weight of 16,000, Tg 85° C.), CAB-551-0.2 (high butyryl cellulose resin with a molecular weight of 30,000, Tg 101° C.), CAB-381-0.1 (a medium butyryl content cellulose ester resin with a molecular weight of 20,000, Tg 123° C., Solus™ 2100 (cellulose resin with a molecular weight of 16,000, Tg 75° C.) from Eastman.

Hydrocarbon resins that may be used include Picccotac 7050 HC resin (aromatic modified C5 resin, Tg 7° C.), Piccolastic D125HC resin (thermoplastic hydrocarbon resin, Tg 64° C.), Kristalex 3100 HC resin (hydrocarbon resin, Tg 51° C.) from Eastman, Nevchem 140 (C9 hydrocarbon resin, softening point 140° C.), Nevex 1069 resin (C9 hydrocarbon resin, softening point 100° C.), Neville 255 resin (C9 hydrocarbon resin, softening point 155° C.) from Neville Chemical, Norsolene 5135 (inert aromatic hydrocarbon resin, Tg 81.7° C.), Norsolene 5125 (inert aromatic hydrocarbon resin, Tg 71.1° C., Norsolene S105(inert aromatic hydrocarbon resin, Tg 53.5° C.), Norsolene S95 (inert aromatic hydrocarbon resin, Tg 46.3° C.), Norsolene S85 (inert aromatic hydrocarbon resin, Tg 45° C.), Norsolene A90 (inert aromatic hydrocarbon resin, Tg 46.4° C.), Wingtack 86 (inert aromatic hydrocarbon resin, Tg 52° C.), Wingtack 98 (aliphatic C-5 hydrocarbon resin, Tg 48) from Cray Valley.

A single type of thermoplastic resin or a combination of two or more types of thermoplastic resin can be used in the embodiments. In many applications the use of two or more different thermoplastic resins is preferred.

The level of inert resin in the oligomer/resin component of adhesive composition embodiments will be about 0% to about 100%, and preferably about 50% to about 100% by weight, with the balance of the resin/oligomer component as oligomer and preferably in an amount of about 80% to about 100% by weight.

The total by weight of inert resin present in the adhesive composition will be about 0% to about 45%, preferably about 5% to about 30%, or more preferably about 8% to about 20%.

Preferred inert thermoplastic resins are thermoplastic resins will have a glass transaction temperature (Tg) of about −40° C. to about 300° C., preferably about 10° C. to about 150° C., or more preferably about 20° C. to about 100° C., and a molecular weight of about 2,000 to about 300,000 g/mole, preferably about 10,000 to about 200,000 g/mole, or more preferably about 20,000 to about 100,000 g/mole.

The Degalan LP 64/12 resin (methacrylic resin with a molecular weight of 68,000, Tg 58° C.), Paraliod B44 (a solid grade acrylic resin (MMA Copolymer) having a Tg of 60° C.), Elvacite 2013 (a solid grade methacrylate resin having a Tg of 76° C.), Dianal BR 106 (a solid grade methacrylate resin having a Tg of 58° C.), Laropal A 81(an aldehyde-ketone resin having a Tg of 73° C.), and SK resin (a hydrogenated acetophenone-folmaldehyde resin having a Tg of 90° C.) are currently preferred inert thermoplastic resins.

Oligomers

One or more oligomers may be used. The oligomers included in embodiments of the adhesive composition will be selected from epoxy (meth)acrylate, polyester (meth)acrylate, polyether (meth)acrylate, and polyurethane (meth)acrylate.

The oligomers should have a molecular weight less than about 100,000 g/mole and a viscosity of less than about 100,000 cps at room temperature. Yet more preferred oligomers are mono-functional polyurethane acrylates having molecular weights of less than about 75,000 g/mole and viscosities of less than about 50,000 cps at room temperature. Other preferred oligomers are mono-functional polyurethane acrylates having molecular weight of less than about 20,000 g/mole and viscosity of less than about 20,000 cps at room temperature.

The oligomers may be a single type of acrylate resin or a combination of two or more types of acrylate resin. The oligomers may have a glass transaction temperature (Tg) of about −35° C. to about 250° C. preferably about 10° C. to about 120° C., or more preferably about 20° C. to about 100° C.

An example of epoxy (meth)acrylates that could be used include Ebecryl 3701 (a modified bisphenol A epoxy diacrylate, Tg 52° C.), Ebecryl 3702 (a fatty acid modified bisphenol A epoxy diacrylate, Tg 56° C.), Ebecryl 3703(an amine modified bisphenol A epoxy diacrylate, Tg 57° C.), from Allnex.

An example of polyester (meth)acrylates that could be used include CN-2302 (a hyperbranched polyester acrylate, Tg 74° C.), CN-2303 (a hyperbranched polyester acrylate, Tg 104° C.), CN-293 (a hexafunctional acrylated polyester oligomer, Tg 21° C.), CN-299 (tetrafunctional acrylated polyester oligomer, Tg 15° C.) from Sartomer, Genorad 40 (a methacrylated phosphate ester, Tg unspecified) from Nahn, Ebecryl 83 (an amine modified polyether acrylate, Tg 6° C.), Ebecryl 436 (a reactive chlorinated polyester resin diluted 40% with the reactive diluent trimethylolpropane triacrylate, Tg 54° C.), Ebecryl 438 (a reactive chlorinated polyester resin diluted 40% with the reactive diluent OTA-480, Tg 37° C.), Ebecryl 450 (Fatty Acid Modified Polyester Hexaacrylate, Tg 17° C.), Ebecryl 812 (low viscosity polyester acrylate, Tg 72° C.), Ebecryl 870 (a fatty acid modified polyester hexaacrylate, Tg 41° C.) from Allnex.

An example of polyether (meth) acrylates that could be used include Ebecryl 80 (an amine modified polyether tetraacrylate, Tg 50° C.), Ebecryl 81 (an amine modified polyester acrylate, Tg −18° C.) and Ebecryl 85 (a low viscosity amine modified polyether acrylate, Tg unspecified) from Allnex.

An example of polyurethane (meth)acryletes that could be used include CN-131(aromatic monoacrylate oligomer, Tg 4° C.), CN9028 (difunctional aliphatic urethane acrylate, Tg unspecified) from Sartomer, Genomer 1122 (monofunctional urethane acrylate, Tg-3° C.), Genomer 4188/EHA (monofunctional urethane acrylate in 20% 2-ethylhexyl acrylate, Tg -17° C.), Geneomer 4188/M22 (a monofunctional urethane acrylate in 35% monomer IBOA, Tg -3° C.) from Nahn, Ebecryl 271 (a difunctional aliphatic urethane acrylate, Tg 19° C.), Ebecryl 242 (an aliphatic urethane acrylate oligomer diluted 30% by weight with the reactive diluent IBOA, Tg 46° C.), Ebecryl 1291 (a hexafunctional aliphatic urethane acrylate, Tg 80° C.), Ebecryl 4100 (an aliphatic urethane triacrylate, Tg 22° C.), Ebecryl 4200 (aliphatic urethane acrylate, Tg 12° C.), Ebecryl 5129 (a hexafunctional aliphatic urethane acrylate, Tg 30° C.), Ebecryl 8210 (an aliphatic urethane acrylate, Tg 68° C.), Ebecryl 8296 (aliphatic urethane acrylate, Tg -1° C.), Ebecryl 8402 (aliphatic urethane diacrylate, Tg 14° C.), Ebecryl 8411(aliphatic urethane diacrylate diluted 20% by weight with the reactive diluent isobornyl acrylate, Tg -18° C.), Ebecryl 8465 (aliphatic urethane triacrylate oligomer, Tg 36° C.), Ebecryl 8604 (an aliphatic urethane tetraacrylate, Tg 79° C.), Ebecryl 220 (a hexafunctional aromatic urethane acrylate, Tg 49° C.), Ebecryl 8702 (an aliphatic urethane hexaacrylate, Tg 28° C.), Ebecryl 8807 (an aliphatic urethane diacrylate, Tg 32° C.) from Allnex.

The level of oligomer in the oligomer/resin component of adhesive composition embodiments will be about 0% to about 100%, and preferably about 50% to about 100% by weight, with the balance of the resin/oligomer component as inert resin and preferably in an amount of about 80% to about 100% by weight.

The total oligomer present in adhesive composition embodiments should be at the level of about 0% to about 45%, preferably about 5% to about 30%, or more preferably about 8% to about 20%, based on the weight of the adhesive composition.

Geneomer 4188/M22 (a monofunctional urethane acrylate diluted in monomer IBOA and having a Tg of -3° C.), Genomer 1122 (monofunctional urethane acrylate, Tg -3° C.), Ebecryl 242 (an aliphatic urethane acrylate oligomer diluted in monomer IBOA and having a Tg of 46° C.), Ebecryl 8402 (aliphatic urethane diacrylate, Tg 14° C.) and CN 131 (aromatic monoacrylate oligomer having a Tg of 4° C.) are examples of currently preferred oligomers.

Mono-Functional Monomers

The mono-functional monomers should contain one functional acrylate group or one C=C double bond. Examples of mono-functional monomers provided herein include aliphatic mono (meth)acrylate, aromatic mono (meth)acrylate, alkoxylated (meth)acrylate, tetrahydrofurfuryl (meth)acrylate, alkoxylated tetrahydrofurfuryl (meth)acrylate, monoacrylic, N-vinyl compound, and acrylamide compound. They are available from suppliers such as Sartomer, Allnex, BASF, and Nippon Kasei, for example:

(1) Laromer TBCH from BASF is a t-butyl cyclohexyl acrylate (Mt. 210, Tg 84° C., viscosity 8 cPs, surface tension 28.5);
(2) SR-531 from Sartomer is a cyclic trimethylolpropane formal acrylate (Mt. 200, Tg 10° C., viscosity 15 cps, surface tension 33);
(3) SR420 from Sartomer is a 3,3,5-trimethyl cyclohexyl acrylate (Mt. 196, Tg 29° C., viscosity 6 cPs, surface tension 27);
(4) SR423A from Sartomer is an isobornyl methacrylate (Mt. 222, Tg 110° C., viscosity 10 cPs, surface tension 31);
(5) SR506 from Sartomer is isobornyl acrylate (Mt. 208, Tg 88° C., viscosity 8 cPs, surface tension 32);
(6) 4HBA from BASF is 4-Hydroxybutyl Acrylate (Mt. 144, Tg -40° C., viscosity 11 cPs, surface tension 35);
(7) NVC from BASF is a N-vinyl caprolactam (Mt. 139, Tg 147° C., viscosity 5 cPs, surface tension 43.9);
(8) NVP from BASF is a N-vinyl pyrrolidone (Mt. 111, Tg 150° C., viscosity 2.5 cPs, surface tension 32.5);
(9) DAAM from Nippon Kasei is a diacetone acrylamide is (Mt. 229, Tg 77° C., viscosity 18 cPs, surface tension 30.6);
(10) SR285 T from Sartomer is a tetrahydro furfuryl acrylate (Mt. 156, Tg -15° C., viscosity 6 cps, surface tension: 36); and
(11) VMOX from BASF is a vinyl methyl oxazolidone (Mt. 127, Tg unspecified, viscosity 4 cps, surface tension unspecified).

Di-Functional Monomers

When difunctional monomers are used they should contain two functional acrylate groups or two C=C double bonds. Adhesive embodiments containing these difunctional monomers generally cure faster than adhesive embodiments that contain only mono-functional monomers. Examples of difunctional monomers that may be used include aliphatic di-(meth) acrylate, aromatic di-(meth)acrylate, alkoxylated aliphatic di-(meth)acrylate, alkoxylated aromatic di-(meth) acrylate, glycol di-(methac)acrylate, cyclohexane dimethanol di-(meth)acrylate. They are available from suppliers such as Sartomer and Miwon, for example:

(1) CD564 alkoxylated hexanediol diacrylate (Mt. 401, viscosity 25 cPs, surface tension 33, Tg 14° C.);
(2) SR213, 1,4-butanediol diacrylate (Mt. 198, viscosity 8 cps, surface tension 36, Tg 45° C.);
(3) SR214, 1,4-butanediol dimethacrylate (Mt. 226, viscosity 7 cps, surface tension 34, Tg 55° C.);
(4) SR230, diethylene glycol diacrylate (Mt. 214, viscosity 12 cps, surface tension 38, Tg 100° C.)
(5) SR231 diethylene glycol dimethacrylate (Mt. 242, viscosity 8 cps, surface tension 35, Tg 66° C.);
(6) SR238b 1,6 hexanediol diacrylate (Mt. 118, viscosity 9 cps, surface tension 36, Tg 43° C.);
(7) SR239 1,6 hexanediol dimethacrylate (Mt. 254, viscosity 8 cps, surface tension 34, Tg 30° C.);
(8) SR247 neopentyl glycol diacrylate (Mt. 212, viscosity 10 cps, surface tension 33, Tg 107° C.);
(9) SR272 triethylene glycol diacrylate (Mt. 259, viscosity 15 cps, surface tension 39, Tg 48° C.);
(10) SR297 1,3-butylene glycol dimethacrylate (Mt. 226, viscosity 7 cps, surface tension 32, Tg 85° C.);
(11) SR306F tripropylene glycol diacrylate (Mt. 300, viscosity 15 cPs, surface tension 33, Tg 62° C.);
(12) SR349 ethoxylated (3) bisphenol a diacrylate (Mt. 469, viscosity 1600 cPs, surface tension 44, Tg 67° C.);
(13) SR508 dipropylene glycol diacrylate (Mt. 242, viscosity 10 cPs, surface tension 33, Tg 104° C.);
(14) SR540 ethoxylated (4) bisphenol a dimethacrylate (Mt. 541, viscosity 555 cPs, surface tension 35, Tg 108° C.);
(15) SR541 ethoxylated (6) bisphenol a dimethacrylate (Mt. 629, viscosity 440 cPs, surface tension 35, Tg 54° C.);
(16) SR601 ethoxylated (4) bisphenol a diacrylate (Mt. 513, viscosity 1080 cPs, surface tension 37, Tg 60° C.);
(17) SR602 ethoxylated (10) bisphenol a diacrylate (Mt. 777, viscosity 610 cPs, surface tension 38, Tg 2° C.);
(18) SR833S tricyclodecane dimethanol diacrylate (Mt. 304, viscosity 130 cPs, surface tension 38, Tg 186° C.);

(19) SR9003B propoxylated (2) neopentyl glycol diacrylate (Mt. 212, viscosity 15cPs, surface tension 32, Tg 32° C.);

(20) Miwon M280 (glycolethylene-400 diacrylate, Mt. 508, viscosity 45-65 cps, surface tension 42.6, Tg −25° C.); and

(21) Miwon M286 (glycolethylene-600 diacrylate, Mt. 708, viscosity 80-120 cps, surface tension 42.3, Tg −41° C.).

Tri-Functional Monomers

When present, the trifunctional monomers contain three functional acrylate groups or three C=C double bonds. Adhesive embodiments containing trifunctional monomers generally cure faster than adhesive embodiments that contain only difunctional monomers. Examples or trifunctional monomers that may be used include:

(1) SR350 trimethylolpropane trimethacrylate (Mt. 338, viscosity 44 cps, surface tension 34, Tg 27° C.);

(2) SR351H trimethylolpropane triacrylate (Mt. 296, viscosity 106 cps, surface tension 36, Tg 62° C.);

(3) SR368D) Tris (2-hydroxy ethyl) isocyanurale triacrylale (Mt. 375, viscosity 33 cps, surface tension 37, Tg 61° C.);

(4) SR444 pentaerythritol triacrylate (Mt. 298, viscosity 52 cps, surface tension 39, Tg 103° C.);

(5) SR454 ethoxylaled (3) trimelhylolpropane triacrylale (Mt. 429, viscosity 110 cps, surface tension 40, Tg 103° C.);

(6) SR501 propoxylaled (6) trimelhylolpropane triacrylale (Mt. 645, viscosity 125 cps, surface tension 33, Tg 21° C.); and (7) SR9020 propoxylated (3) glyceryl triacrylate (Mt. 422, viscosity 95 cps, surface tension 36, Tg 18° C.).

The monomers used in embodiments of the adhesive composition should have molecular weights less than about 1000 g/mole and viscosities less than about 100 cps, preferably molecular weights less than about 500 g/mole and viscosities lower than about 50 cps, and more preferably having molecular weights less than about 250 g/mole and viscosities less than about 20 cps.

The monomers should have a glass transition temperature (Tg), after being polymerized, of about −20° C. to about 175° C., preferably about 10° C. to about 100° C., and more preferably about 20° C. to about 90° C.

The total level of monomer(s) used in embodiments of the adhesive composition should be in the range of about 20 to 70%, and preferably in the range of about 25% to 60%, and more preferably in the range of about 30% to 50% based on the weight of the adhesive composition.

Monomers used in embodiments of the adhesive composition may comprise 100% mono-functional monomers. Isobornyl acrylate such as SR506 from Sartomer (Mt. 208, Tg 88° C., viscosity 8 cps, surface tension 32) has been found to be a particularly preferred mono-functional monomer in terms of curing speed, adhesion, and foil transfer quality. t-butyl cyclohexyl acrylate such as Laromer TBCH from BASF (Mt. 210, Tg 84° C., viscosity 8 cps, surface tension 28.5), is another particularly preferred mono-functional monomer in terms of curing speed, adhesion, and foil transfer quality.

The monomers used in embodiments may also comprise vinyl-containing monomers or acrylamide monomers, such as N-vinyl caprolactam (Mt. 139, Tg 147° C., viscosity 5 cps, surface tension 43.9), N-vinyl pyrrolidone (Mt. 111, Tg 150° C., viscosity 2.5 cps, surface tension 32.5), vinyl methyl oxazolidone (VMOX, Mt. 127, Tg unspecified, viscosity 4 cps, surface tension unspecified), diacetone acrylamide (Mt. 229, Tg 77° C., viscosity 18 cps, surface tension 30.6), in a loading of less than 25%, preferably less than 15%, and more preferably less than 10% of total monomer composition may be included to increase the curing speed and improve surface properties or cured film.

In some embodiments, up to 10% by weight, preferably no more than 5% by weight, and more preferably no more than 3% of di- or tri-functional monomer (e.g., SR-833, tricyclodecane dimethanol diacrylate and SR-454, ethoxylated trimethylolpropane triacrylate (from Sartomer), VEEA 2-(2-vinyloxyethoxy)ethyl acrylate (from Nippon Shokubai) may be incorporated in adhesive composition embodiments.

It is an unexpected discovery in embodiments of the present disclosure that the exclusion of multi-functional monomers or, less preferably, limiting the level of multi-functional monomers to difunctional and trifunctional monomers at a level of no more than 10% and preferably no more than 5% of the total monomer component of the composition and excluding higher functional monomers produce good curing speed and desirable printed image properties. This discovery is at odds with conventional, currently accepted adhesive, ink, and coating products which typically use high functionality monomers to achieve desired rapid curing speed.

High Functionality Monomers

High functional acrylate monomer refers to an acrylate monomer containing greater than three functional acrylate groups. Examples of these monomers available from suppliers (e.g., Sartomer) include:

(1) SR295 pentaerythritol tetraacrylate (Mt. 352, viscosity 342 cPs, surface tension 40, Tg 103° C.);

(2) SR355 di-trimethylolpropane tetraacrylate (Mt. 467, viscosity 600 cPs, surface tension 36, Tg 98° C.);

(3) SR399 dipentaerythritol pentaacrylate (Mt. 525, viscosity 1360 cPs, surface tension 40, Tg 90° C.); and (4) SR9041 pentaacrylate ester (Mt. 525, viscosity 15000 cPs, surface tension 41, Tg 102° C.

The use of a high functionality monomer provides a fast curing and increases the extent of crosslinking but brings about negative impact on foil transfer quality in the foiling application. Therefore, the use of high functionality monomer is not encouraged for the specific applications described in the present disclosure.

Functional Additives

The functional additives (or other composition ingredients) included in the present disclosure are photoinitiators (used for UV and LED curable compositions), synergists, stabilizers, wetting/flow agents, de-foamers, and wax compounds.

Photoinitiators

Photoinitiators initiate free-radical photopolymerization during UV or LED curing. Both Type I (cleavage) and Type 2 (H abstraction) photoinitiators may be used. EB curable adhesive compositions do not require the use of photoinitiators.

UV and LED curable flexographic foiling adhesive compositions may contain one of more photoinitiators. Examples of photoinitiators that can be applied to the UV curable or LED curable flexographic foiling adhesive compositions include, but are not limited to, benzophenone, benzoin ether and their derivatives. These include benzophenone, chloro-benzophenone, 4-phenylbenzophenone, trimethyl-benzophenone, 3,3'-dimethyl-4-methoxybenzophenone, benzoin methyl ether, benzoin ethyl ether, benzoin phenyl ether, and alkylbenzoins, such as methylbenzoin, ethylbenzoin, and propylbenzoin. These photoinitiators are commercially available as Omnirad BP, Omnirad 4MBZ, Omnirad 4PBZ, Omnirad OMBB, Omnirad 4HBL, Omnirad BEM, Omnirad EMK, Omnirad MBF, and Omnirad BDK from IGM. Other photoinitiators that may be used include a-hydroxy ketone such as 1-hydroxy-cyclohexyl-phenyl ketone, 2-hydroxy-2-methyl-1-phenylpropanone, and 2-hydroxy-2-methyl-1-(4-isopropylphenyl) propanone. These photinitiators are available products as Omnirad 73, Omnirad 481 from IGM. Still other photoinitiators that may be used include a-amino ketone and its derivatives, which are commercially available products include Omnirad 369, 379, 907 from IGM. Thioxanthone and its derivatives including thioxanthone, isopropyl-thioxanthone, 2-chloro and 2-ethyl-thioxanthone which are commercially available products include Omnirad ITX and Omnirad DETX from IGM, acyl phosphine and bis-acryphosphine oxide and their derivatives which are commercially available products include Omnirad TPO, Omnirad TPO-L, Omnirad 819/Omnirad 380 from IGM.

Photoinitiators that are also suitable for the use in UV and LED curable, adhesive compositions are polymeric benzophenone derivatives, polymeric aminobenzoates, polymeric thioxanihone derivatives, polymeric a-hydroxy ketone. Commercially available, such products include the polymeric benzophenone derivatives (GENOPOL BP-I from Rahn and Omnipol BP from IGM), the polymeric aminobenzoates (GENOPOL AB-I from Rahn and Omnipol ASA from IGM), the polymeric thioxanthone derivatives (GENOPOL TX-I from Rahn and Omnipol TX from IGM), and the polymeric a-hydroxy ketone (Chivacure 150 and 70 from Chitec).

The photoinitiators used in UV curable adhesives absorb a wide range of actinic wave bands that are generated by the conventional mercury UV lamp (e.g, from 220 nm to 410 nm). The photoinitiators used in LED curable adhesive embodiments absorb the longer actinic wave bands that are emitted by the LED lamp (e.g., 395 nm, 365 nm).

The amount of photoinitiator present in the adhesives should be generally less than 20% based on the weight of the adhesive composition, but may be less than 15%, less than 10%, or between 5-10%, based on the weight of the adhesive composition. A level of about 10% to about 15% is currently preferred.

Currently, the Omnirad 481 (1-hydroxycyclohexylphenyl ketone) and Omnirad BP from IGM are preferred photoinitiators for the UV curable, heat activated flexographic adhesive for foiling application.

Omnirad 907 (2-methyl-1 [4-(methylthio) phenyl-2-morpholinopropan-1-one), Omnirad ITX (2-isopropyl thioxanthone) are another preferred photoinitiators for the UV curable, heat activated flexographic adhesive for foiling application.

Omnirad TPO (2,4,6-trimethylbenzoyldiphenylphosphine oxide), Omnirad 819 (bis(2,4,6-trimethylbenzoyl) phenylphosphineoxide), Omnirad 369 (2-benzyl-2-(dimethylamino)-4'-morpholinobutyrophenone), Omnirad 379 (2-dimethylamino-2-(4-methyl-benzyl)-1-(4-morpholin-4-yl-phenyl)-butan-1-one), and Omnirad ITX (2-isopropyl thioxanthone) are among the preferred photoinitiators for LED curable, heat activated flexographic adhesive for foiling application.

Synergists

Preferably a synergist is included in composition embodiments to reduce the oxygen inhibition during photopolymerization and thus improve the curing speed. A free amine synergist may be included. Suitable examples of free amine synergists include, but are not limited to, triethanolamine, N-methyldiethanolamine, N,N-dimethylethanolamine, 2-(dimethylamino)ethylbenzoate, ethyl-4-(dimethylamino) benzoate, 2-ethylhexyl-4-(dimethylamino) benzoate. These synergists are commercially available as Omnirad DMB, Omnirad EDB, Omnirad EHA, and Omnirad ADB from IGM.

An acrylate amine synergist or a polymeric amine synergist may also be included in the adhesive formulation. Commercially available acrylate amine synergist products include Ebecryl 7100, Ebecryl 115 and Ebecryl P116 from Allnex; CN374, CN381, CN-1002, CN3705, CN3715, CN3735, CN3755 from Sartomer; Laromer PO 94F, Laromer P077F from BASF. Commercially available polymeric amine synergist products include Omnipol ASA, Omnipol SZ from IGM, and GENOPOL AB-I from Rahn.

Mono-functional amine and acrylate amine synergist are preferred synergists used in the embodiments of the adhesive composition. Examples of these synergist are mono-functional amine EHA from IGM, and CN3175 from Sartomer.

The synergists preferably are incorporated into the adhesive compositions at a loading by weight of about 0% to about 20% or preferably about 2% to about 15%, or more preferably about 3% to about 10% based on the weight of the adhesive composition.

Stabilizers/Polymerization Inhibitors

Adhesive composition embodiments include one or more polymerization inhibitors or stabilizers to help prevent the adhesive from agglomerating and conventional gelling during production, storage, and transportation, and reduce/eliminate surface cracking of the cured composition. Examples of suitable inhibitors include phenolic materials (e.g., benzoquinone, hydroquinone, hydroquinone monomethyl ether, butylated hydroxytoluene), phenothiazines, nitrosophenyl hydroxylamine aluminium salts, benzotriazolealuminium salt amine complexes, aromatic ammine, nitroxyl compounds. These stabilizers are commercially available as Genorad-16, Genorad-18 Genorad-26 from Nahn, Florstab. UV-1, UV-2, UV-5 from Kromachem LTD, and IrgastabUV-10, Irgastab UV-22 from BASF.

Currently preferred stabilizers/polymerization inhibitors include Generlad-16 (proprietary inhibitor in acrylic acid ester) at a level of about 0.05% to about 3.0%, preferably at a level of about 0.1% to about 2.0% and more preferably al a level of about 0.2% to about 1.0%, based on the weight of adhesive composition.

Wetting/Flow Agents

Conventional wetting/flow agents can be included in adhesive compositions to modify surface tension and control the flow/levelling properties to ensure that the substrate wets properly and the adhesive flows and levels properly when applied. The wetting/flow agents may be silicone-free types (e.g., acrylate polymer) or silicone-containing types (e.g., polyether modified polydimethylsiloxane). These wetting/flow agents are commercially available as Tego 2100 from Evonic, Byk 307 and Byk Dynwet-800 from Byk, Ebecryl 350, Eebecryl 1360, modaflow 9200 from Allnex, Radadd 1116 from Trilogy, and DC-57 from Dow Corning. The level of wetting/flow agents will vary depending on the particular agents used but generally will be present at a level of at least about 0.1% and no more than about 5.0% based on the weight of the adhesive composition.

Currently preferred wetting/flow agents include Radadd 1116 from Trilogy at a level of about 0.01% to about 5.0%, preferably at a level of about 0.25% to about 2.0% and more preferably at a level of about 0.5% to about 1.5%, based on the weight of adhesive composition.

Ebecryl 1360 is another preferred wetting/flow agent at a level of about 0.01% to about 5.0%, preferably at a level of about 0.25% to about 2.0% and more preferably al a level of about 0.5% to about 1.5%, based on the weight of adhesive composition.

De-Aerators/Defoamers

Conventional foam mitigating or foam destroying materials may be included in embodiments of the adhesive composition as a de-aerator, and/or a defoamer. Defoaming agents are generally included to limit the formation of macrofoam at the surface of a liquid. Deaerating agents are generally included to speed removal of air that has been mixed into the coating film during application as quickly as possible.

Examples of these materials include polyacrylates, polyglycols, polyols, polysiloxanes, oxyalkylene amines, silicone oils and fluids, and polyether modified methylalkyl polysiloxane copolymers and combinations thereof.

Examples of de-aerators that can be used include TEGO 910 (silicone free polymer), TEGO 920 (silicone-free air release additive), TEGO 900 (organo-modified polysiloxane) available from Evonik, and Byk-500 (silicone-free air release additive) available from Byk.

Examples of defoamers that can be used include TEGO Foamex N (Dimethyl polysiloxane), the TEGO 810 (polyether siloxane copolymer), the TEGO 845 (organo-modified polysiloxane) from Evonik, the Byk-535 (silicone free polymer), the BYK-055 (Silicone-free solution of foam destroying polymer), the Byk-1790 (silicone-free, polymer-based defoamer), BYK-1791 (silicone-free, aromatic-free, polymer-based defoamer) from BYK, the Foam blast UVD (silicone/silica concentrate loam control agent) from Emerald Performance Materials.

Embodiments of the adhesive composition may contain the de-aerators BYK-500 (silicone-free air release additive), BYK-535 (silicone-free polymer), or BYIK-1791 (silicone-free, aromatic-free, polymer-based defoamer) in a loading of about 0.01% to about 2.5%, or preferably about 0.10% to about 2.0%, or more preferably about 0.25% to about 1.5%, based on the weight of the adhesive composition.

Wax

Waxes selected from synthetic waxes, semi-crystalline waxes, petroleum waxes, microcrystalline waxes, paraffin waxes animal waxes, vegetable waxes, carnauba waxes, mineral waxes may be included in embodiments of the adhesive composition. Once dispersed, the wax (when used) must be compatible with the other components in the adhesive composition embodiment to ensure that the composition remains stable and separation/floating will not occur when the adhesive is stored or applied through a flexographic printing process.

For example, embodiments including the carnauba wax Lanco™ 1955 SF (available from Lubrizol) should be present at a loading of about 0.02% to about 3.0%, preferably about 0.05% to about 2.0%, or more preferably about 0.10% to about 1.0%, based on the weight of the adhesive composition. Embodiments may also include, for example, polyethylene wax S-395-N5 (available from Shamrock) in loading of about 0.02% to about 3.0%, preferably about 0.05% to about 2.0%, or more preferably about 0.10% to about 1.0%, based on the weight of the adhesive composition.

EXAMPLES

The following examples are provided for illustrative purposes only and are not to be construed as in any way limiting the claimed subject matter.

Example 1: The Free Radical Based UV Curable, Heat Activated Flexographic Adhesive (1) The Formula and Curing Properties for UV Curable, Heat Activated Flexographic Adhesive Embodiment Many inert resins come in powder or pellet status. For the convenience in adhesive preparation, these resins can be dissolved in suitable monomers and form uniform resin-monomer solutions. The inert resins (30 g of Degalan LP 64/12 resin in this example), together with stabilizers (1 g of Genorad 16 in this example), are placed into a 200 ml metal jar containing mono-functional monomers (69 g of BASF Laromer TBCH 105 in this example). The blend was mixed under agitation (1000 rpm-2500 rpm) at 60° C. –90° C. for about 2-4 hours until a homogeneous resin solution was formed.

The inert resin solution used was a 30% Degalan LP 64/12 resin solution. The Degalan LP 64/12 resin itself is a methacrylic copolymer (supplied by Evonik) having a molecular weight (Mt.) of 68,000 and glass transaction temperature (Tg) of 58° C.

The UV curable adhesive was prepared according to the formula given in Table 1 below. All amounts were in weight percentage (wt %) unless specified otherwise. Each of the components in the formula was added in a 100 ml plastic container. The container was sealed properly with a lid and then placed in a Speed Mixer (DC 150.1 FVZ-K from FlackTek, Inc.) and be mixing at 2500 rpm until a homogenous adhesive solution was formed. The homogenous adhesive solution was filtered with a 100 micro mesh filter to remove any undissolved particles. The adhesive viscosity was recorded at 25° C. using a CAP 2000 plus Viscometer (Brookfield, Spindle #4, 900 rpm, Hold 60 seconds).

The above adhesive was then printed onto a two-side coated paper (Productolith C2S), with a Harper handproofer equipped with an anilox (13 BCM.) The printed adhesive was UV cured through an AMS UV curing unit (provided by AMS Spectral UV, A Baldwin Technology Company) equipped with a 300 w/inch UV lamp. The print was evaluated for its surface tack by finger touch immediately after cure. The dose required for a surface-tack free print was recorded.

The adhesion of the cured film to the paper substrate was assessed with an 810 tape test which is a test of adhesion that is well-recognized in the ink coating field. The results are reported below as "pass" or "fail", in which "pass" indicates no adhesive removal from the substrate and "fail" indicates greater than 10% adhesive removal from the substrate.

As shown in Table 2, the results demonstrate that the inventive adhesion is cured to surface tack-free upon exposure to the UV radiation having a dose of 175 mJ/cm 2. The cured surface stays tacky-free all the time afterwards at 25° C. under the lab storage conditions. The cured film presents an acceptable 810 tape adhesion.

TABLE 1

UV curable, heat activated flexographic adhesive component

| | | % |
|---|---|---|
| Genomer 4188/M22 polyurethane acrylate | A monofunctional urethane acrylate in 35% monomer IBOA, Tg −3° C. | 27.30 |

TABLE 1-continued

UV curable, heat activated flexographic adhesive component

| | | % |
|---|---|---|
| Degalan LP 64/12 TBCH 105 solution (30%) | methacrylic resin with a molecular weight of 68,000, Tg 58° C. | 29.10 |
| Eternal TBCH 105 | t-butyl cyclohexyl acrylate have a Tg of 84° C. | 28.00 |
| Byk-535 | silicone-free de-aerator | 1.00 |
| RadAdd 1116 | silicones flow/levelling agent | 1.00 |
| Omnirad 819 | bis(2,4,6-trimethylbenzoyl)-phenylphosphineoxide | 0.50 |
| Omnirad TPO | 2,4,6-trimethylbenzoyldiphenylphosphine oxide | 0.50 |
| Omnirad 481 | 1-hydroxycyclohexyl-phenyl ketone | 7.60 |
| Omnirad BP | benzophenone | 5.00 |
| Total | | 100.0 |
| Viscosity (cPs at 25 C.) | | 765 |

TABLE 2

Curing properties of the UV curable, heat activated flexographic adhesive

| | |
|---|---|
| Doses required for a surface-tack free (mJ/cm$^2$ for total UV-a, UV-b, and UV-c)-measured by ILT490 Profiling Belt radiometer, International Light Technologies) | 175 |
| Surface tackiness for immediate cure | surface tack-free |
| 810 tape adhesion test | pass |

If tested, it would be found that immediate tack free surfaces can be achieved by using or incorporating other inert resins, or oligomers, or monomers, or additives within the teaching of the specification above, or by adjusting the ratios between these components, also within the teaching of the specification above. If adjustments were made in the composition, it would be found that the radiation dose required for the immediate tack-free surface can be reduced to 50 mJ/cm 2 (total UV-a, UV-b, and UV-c).

The substrate (paper) bearing the cured, surface tack-free adhesive was used to conduct the foiling application testing.

(2) Foil Transfer Properties in Lab Test for the UV Curable, Heat Activated Flexographic Adhesive The foil transfer tested related to an "off-line" and "die-less" hot foiling application. The "off-line" and "die-less" hot foiling was simulated by a lab operation that involved the use of a SRL-2700 plus laminator (supplied by Sircle Corp). Firstly, a small piece of CFR-4T035 cold foil (from ITW) was placed on top of the paper substrate bearing the cured, surface tack-free adhesive. Then, this sandwiched structure (foil/cured adhesive/paper) was fed in the SRL-2700 plus laminator and passed through the nip formed by an impression roll and a heat roll. In the nip the foil was pressed into firm contact with the substrate and the foil transfer occurred under the impression (around 5 psi) and heat (around 104° C./or 220° F.). The foiling quality was acceptable under the corresponding test conditions. The transferred foil exhibited an acceptable 810 tape adhesion property.

When a hot foil SFK-1067 (from ITW) was applied under the same conditions, a good transfer quality was achieved as well. The transferred foil also exhibited a good 810 tape adhesion properly.

(3) The Off-Line, Die-Less Foiling for the UV Curable Heat Activated Flexographic Adhesive The above UV curable, heat activated flexographic adhesive was assessed for their curing properties and foil transfer properties through a flexo printing and an off-line foiling process. A GI DUE S.P.A Narrow Web Printing and Converting Machines [22078 Turate (Co)-Italy] was used to run the flexo adhesive application. This unit was equipped with a 300 w/in UV lamp to cure the adhesives applied. The UV curable, heat activated flexographic adhesive was applied to the white paper (Mactac AC-9502). The patterns of the adhesive to be delivered was regulated by the relief image of the photopolymer plate provided by DuPont, which contains the INX company logo, solids, types (12 point to 3 point), and screens (1% to 100%). The volume of the adhesive transferred to the substrate was around 3.9 gsm and this was regulated by using a 10 BCM anilox roll.

When the UV curable flexographic adhesive was printed on the white paper (Mactac AC-9502) in the designed image pattern and in a desired coat weight, it cured and became surface tack-free when exposed to the UV radiation at the running speeds of 100 fpm to 300 fpm. The white paper bearing the cured adhesive were then rewound into rolls for storage.

The off-line, die-less hot foiling was conducted using a SRL-2700 plus laminator (supplied by Sircle Corp). Firstly, the roll of substrate bearing the cured adhesive was unwound, and cut into a regular piece according to the print repeat. Then, a cold foil (CFR-4T035 from ITW) was placed on top of a piece of the white paper substrate bearing the cured, surface tack-free adhesive. Secondly, the sandwiched structure (foil/cured adhesive/substrate) was fed in the laminator and passed through the nip located in between an impression roll and a heat roll. The foil transfer was conducted under impression pressure (around 5 psi) and heat (around 82° C./or 180° F.). Thirdly, peel off the carrying back from the foil and have the foiled sheet ready for evaluation.

The foiling quality was acceptable under the corresponding test conditions. The transferred foil (from cold foil 4T-035) presented a good 810 tape adhesion property.

Following the cold foil transfer test, a hot foil (SFK-1067 from ITW) was applied under the same condition. A good foil transfer quality was obtained as well for the hot foil. The hot foil also exhibited a good 810 tape adhesion property.

Besides white paper substrate, the UV curable, heat activated flexographic adhesive was also applied to white PP film (supplied by Mactac) under the same printing conditions and curing conditions. Foiling test was conducted with a cold foil 4T-035 and a hot foil (SFK-1067), respectively. The foiling quality on white PP film was acceptable and the transferred foils (from either the cold foil 4T-035 or the hot foil SFK-1067) exhibited a good 810 tape adhesion property.

Example 2: The LED Curable, Heat Activated Flexographic Adhesive (1) The Formula and Curing Properties for LED Curable, Heat Activated Flexographic Adhesive Embodiment The LED curable, heat activated flexographic adhesive was prepared according to the formula shown in Table 3. This also involved the use of the inert resin Degalan LP 64/12. The method used in preparing the LED curable, heat activated adhesive was the same as it was used in preparing the UV curable, heat activated adhesive. The adhesive viscosity was recorded at 25° C. using a CAP 2000 plus Viscometer (Brookfield, Spindle #4, 900 rpm, Hold 60 seconds).

The LED curable flexographic adhesive was then printed onto a two-side coated paper (Productolith C2S), with a Harper handproofer equipped with a 13 BCM anilox. The printed adhesive was LED cured through an AMS LED curing unit (provided by Air Motion System) equipped with a 17 w/cm LED lamp. The print was evaluated for surface tack by finger touch immediately after cure. The dose required for a surface-tack free cured print was recorded.

The adhesion of the cured film to the paper substrate was assessed with the 810 tape test. The results were reported as "pass" or "fail", in which "pass" corresponds to a no adhesive removal from the substrate and "fail" corresponds to greater than 10% adhesive removal from the substrate.

The results in Table 4 revealed that a dose of 200 mJ/cm 2 in long actinic wave band (mainly from UV-A2) is necessary for the LED curable flexographic adhesive to get fully cured. The cured surface stayed tacky-free at 25° C. under the lab storage conditions. The cured film provided an acceptable 810 tape adhesion.

TABLE 3

LED curable, heat activated flexographic adhesive component

| | | % |
|---|---|---|
| Genomer 4188/M22 polyurethane acrylate | A monofunctional urethane acrylate in 35% monomer IBOA, Tg −3° C. | 25.70 |
| Degalan LP 64/12 resin TBCH 105 solution (30%) | methacrylic resin with a molecular weight of 68,000, Tg 58° C. | 27.10 |
| Eternal TBCH 105 | t-butyl cyclohexyl acrylate have a Tg of 84° C. | 32.00 |
| Byk-535 | silicone-free de-aerator | 1.00 |
| RadAdd 1116 | silicones flow/levelling agent | 1.00 |
| Omnirad 819 | bis(2,4,6-trimethylbenzoyl)-phenylphosphineoxide | 2.50 |
| Omnirad TPO | 2,4,6-trimethylbenzoyldiphenylphosphine oxide | 4.50 |
| Omnirad EHA | 2-ethylhexyl-4-dimethylaminobenzoate | 2.00 |
| Omnipol TX | Diester of carboxymethoxy thioxanthone and polytetramethyleneglycol 250. Acts as a polymeric photo initiator. | 1.50 |
| Omnirad 369 | 2-benzyl-2-(dimethylamino)-4'-morpholinobutyrophenone | 2.50 |
| Genorad 16 | polymerisation inhibitor in acrylic acid ester | 0.20 |
| Total | | 100.00 |
| Viscosity (cPs at 25° C.) | | 957 |

TABLE 4

Curing properties of the LED curable, heat activated flexographic adhesive

| | |
|---|---|
| Doses required for a surface-tack free (mJ/cm$^2$ for total UV-A2, 375-415 nm)-measured by a LED Power Puck designed and manufactured by EIT. Inc Sterling, VA20164, USA | 200 |
| Surface tackiness for immediate cure | surface tack-free |
| 810 tape adhesion test | pass |

If tested, it would be found that an immediate tack-free surface can be achievable by using or incorporating other inert resins, or oligomers, or monomers, or additives, within the teaching of the specification above, or by adjusting the ratios between these components, also within the teaching of the specification above. If tested, it would also be found that the radiation dose required for achieving surface tack-free can be further reduced to 100 mJ/cm 2 (total UJV-A2).

The substrate bearing the cured, surface lack-free adhesive was used to conduct the foiling application described in below.

(2) Foil Transfer Properties in Lab Test for the LED Curable, Heat Activated Flexographic Adhesive Foil transfer was conducted using a SRL-2700 plus laminator (supplied by Sircle Corp). This was a simulation of die-less hot foiling as the foil transfer was realized through a heating roller and an impression roller provided by the laminator. The pressure of the impression roller was preset at about 5 psi and the temperatures of the heating roller was adjustable within the range 60° C. to 149° C. (i.e., 140° F. to 300° F.).

A cold foil (CFR-4T035 from ITW) was placed on top of a paper substrate bearing with the cured adhesive. Then, this sandwiched structure (foil/cured adhesive/paper) was fed into the laminator and passed through the nip located between an impression roll and a heat roll. In this nip, the foil was pressed into firm contact with the substrate and foil transfer occurred under the impression pressure (around 5 psi) and heat (around 104° C./or 220° F.). The foiling quality was acceptable under the corresponding test conditions. The transferred foil presented a good 810 tape adhesion property.

Following the cold foil transfer test, a hot foil (SFK-1067 from ITW) was applied under the same condition. A good foil transfer quality was obtained as well for the hot foil. The hot foil also exhibited a good 810 tape adhesion property.

(3) The Off-Line, Die-Less Foiling for the LED Curable, Heat Activated Flexographic Adhesive The LED curable, heat activated flexographic adhesive was assessed for their curing properties and foil transfer properties through a flexo printing and an off-line foiling process. A GI DUE S.P.A Narrow Web Printing and Converting Machines [22078 Turate (Co)-Italy] was used to run the flexo adhesive application. This unit was equipped a 12 W/cm LED lamp to cure the adhesives applied. The LED curable, heat activated flexographic adhesive was applied to the white paper (Mactac AC-9502) and white PP film (supplied by Mactac), respectively. The patterns of the adhesive to be delivered was regulated by the relief image of the photopolymer plate provided by DuPont, which contained the INX company logo, solids, types (12 point to 3 point), and screens (1% to 100%). The volume of the adhesive transferred to the substrate was around 3.9 gsm and this was controlled by using a 10 BCM anilox roll.

When the LED adhesive was printed on the substrates in the designed image pattern and in a desired coat weight, it cured and became surface tack-free when exposed to the LED radiation. The substrates bearing the cured adhesive were then rewound into rolls for storage.

The hot foiling was conducted using a SRL-2700 plus laminator (supplied by Sircle Corp). Firstly, the roll of substrate bearing the cured adhesive was unwound, and cut into a regular piece according to the print repeat. Then, a cold foil (CFR-4T035 from ITW) and a hot foil (SFK-1067 from ITW) were placed, respectively, on top of a piece of the white paper substrate bearing the cured, surface tack-free adhesive. Secondly, the sandwiched structure (foil/cured adhesive/substrate) was fed in the SRL-2700 plus laminator and passed through the nip located in between an impression roll (around 5 psi) and a heat roll (around 82° C./or 180° F.). Thirdly, peel off the carrying back from the foil and have the foiled sheet ready for evaluation.

An acceptable image quality was achieved for the die-less hot foiling. The transferred foil had an acceptable 810 tape adhesion property for both the 4T-035 cold foil and SFK-1067 hot foil.

As the same as it was occurred on paper substrate, when the die-less foiling was conducted on the white PP film bearing the cured, surface tack-free adhesive, an acceptable image quality was also achieved for the die-less hot foiling. The transferred foil patterns had an acceptable 810 tape adhesion property for both the 4T-035 cold foil and SFK-1067 hot foil.

Example 3: The EB Curable, Heat Activated Flexographic Adhesive (1) The Formula and Curing Properties for the EB Curable, Heat Activated Flexographic Adhesive Embodiment The EB curable, hot activated adhesive was prepared according to the formula shown in Table 5. This also involved the use of the inert resin Degalan LP 64/12 and the polyurethane acrylate Genomer 4188/M22. The method used in preparing the EB curable, heat activated adhesive was the same as it was used in preparing the UV curable, heat activated adhesive. The adhesive viscosity was recorded at 25° C. using a CAP 2000 plus Viscometer (Brookfield, Spindle #4, 900 rpm, Hold 60 seconds).

The above EB curable adhesive was then printed, onto a two-side coated paper (Productolith C2S) with a Harper handproofer equipped with a 13 BCM anilox. The printed adhesive was cured through an E-Beam unit (provided by Comet Technologies USA Inc). The air gap, the electrical voltage, the curing speed was set as 10 mm, 125 Kv, 15 mpm, respectively. The oxygen concentration in the curing chamber was maintained 200 ppm with a well-controlled nitrogen flow. The cured print was then evaluated for its surface tack by finger touch immediately after cure. The dose required for a surface-tack free print was recorded.

The adhesion of the cured film to the paper substrate was assessed with the well-known 810 tape test. The results were given as "pass" or "fail", where "pass" corresponds to a no adhesive removal from the substrate and "fail" corresponds to greater than 10% adhesive removal from the substrate.

As shown in Table 6, the results demonstrated that the EB curable adhesive was fully cured at a radiation dose of 30 KGy. The fully cured adhesive film had a good 810 tape adhesion property.

TABLE 5

| EB curable, heat activated flexographic adhesive component | | |
| --- | --- | --- |
| | | % |
| Genomer 4188/M22 polyurethane acrylate | A monofunctional urethane acrylate in 35% monomer IBOA, Tg −3° C. | 31.35 |
| Degalan LP 64/12 resin TBCH solution (30%) | methacrylic resin with a molecular weight of 68,000, Tg 58° C. | 31.35 |
| Eternal TBCH 105 | t-butyl cyclohexyl acrylate have a Tg of 84° C. | 30.40 |
| Byk-535 | silicone-free de-aerator | 0.95 |
| RadAdd 1116 | silicones flow/levelling agent | 0.95 |
| CN-3715 | acrylate amine synergist | 5.00 |
| Total | | 100.0 |
| Viscosity (cPs at 25° C.) | | 944 |

TABLE 6

| Curing properties of the EB curable, heat activated flexographic adhesive | |
| --- | --- |
| Doses required for a surface-tack free (KGy) | 30 |
| Surface tackiness upon immediate cure | surface tack-free |
| 810 tape adhesion test | pass |

If tested, it would be found that an immediate tack-surface free is achievable by using or incorporating other inert resins, oligomers, monomers, and additives within the teaching of the specification above, and by adjusting the ratios between these components, also within the teaching of the specification above. By making appropriate formulation changes within the teaching above, it would be found that the radiation dose required for the achievement of surface tack-free can be further reduced to 10 KGy.

A substrate bearing the cured, surface tack-free adhesive above was used to conduct a foiling application.

(2) Foil Transfer Properties in Lab Test for the EB Curable, Heat Activated Flexographic Adhesive The foil transfer was conducted using a SRL-2700 plus laminator (supplied by Sircle Corp. A cold foil CFR-4T035 (from ITW) was placed on top of the paper substrate bearing the cured, surface tack-free adhesive. Then, the sandwiched structure (foil/cured adhesive/paper) was fed into the laminator and passed through the nip located in between an impression roll and a heat roll. The foil transfer was conducted under the impression pressure (about 5 psi) and heat (about 93° C./or 200° F.). The foiling quality was acceptable under the corresponding test conditions. The transferred foil presented a good 810 tape adhesion property.

Following the cold foil, a hot foil SFK-1067 (from ITW) was also applied under the same conditions. A good foil transfer quality for hot foil was achieved as well. The hot foil transferred to the paper substrate also exhibited a good 810 tape adhesion property.

(3) The Off-Line, Die-Less Foiling for the EB Curable, Heat Activated Flexographic Adhesive If the curing properties and foiling performance of the EB curable composition above were assessed along the lines described for the UV and LED curable compositions, it would be found that acceptable image quality could be achieved for die-less hot foiling.

The present disclosure has been described in detail, including the preferred embodiments thereof. The use of the terms "a" and "an" and "the" and similar referents in the context of describing embodiments of the present disclosure including in the context of the following claims are to be construed to cover both the singular and the plural, unless otherwise indicated or clearly contradicted by context. Recitation of ranges of values are intended to serve as a shorthand method of referring individually to each separate value falling within the range, unless otherwise indicated, and each separate value is incorporated into the specification as if it were individually recited herein. All methods described herein can be performed in any suitable order unless otherwise indicated or otherwise clearly contradicted by context. The use of any and all examples, or exemplary is intended to help illuminate embodiments of the present disclosure and not to establish a limitation on the scope of the present disclosure unless otherwise claimed. No language in the specification should be construed as indicating any non-claimed element as essential to the practice of embodiments of the present disclosure. It should be understood that the illustrated embodiments are exemplary only, and should not be taken as limiting the scope of the invention.

What is claimed is:

1. An adhesive composition comprising:
   about 20% to about 70% of a monomer component (by weight of the adhesive composition), the monomer component comprising one or more free-radical curing monofunctional monomers and including bifunctional and/or trifunctional free-radical curing monomers at a level of no more than about 3% by weight of the monomer component;
   about 10% to about 60% of an oligomer/resin component (by weight of the adhesive composition), the oligomer/resin component comprising one or more oligomers, one or more inert thermoplastic resins, or a combination thereof, the oligomer/resin component being soluble in the one or more monofunctional monomers; and
   optionally one or more functional additives for curing the adhesive composition upon exposure to UV, LED, or EB radiation,
   wherein the adhesive composition forms a hardened tack-free solid at room temperature when cured upon exposure to UV, LED, or EB radiation, and wherein the cured adhesive composition is rendered tacky upon exposure to heat and pressure.

2. The adhesive composition of claim 1, wherein the one or more inert thermoplastic resins have a molecular weight in the range of about 2000 g/mole to about 300,000 g/mole and are selected from the group consisting of rosin ester resins, cellulose resins, polyester resins, aldehyde resins, epoxy resins, acrylic resins, methacrylic resins, acrylate resins, methacrylate resins, urea aldehyde resins, vinyl chloride copolymers, melamine-formaldehyde resins, polyurethane resins, polyimide resins, alkyd resins, phthalate resins, and a combination thereof.

3. The adhesive composition of claim 1, wherein the one or more inert thermoplastic resins have a glass transition temperature $T_g$ of about −40° C. to about 300° C. and a molecular weight of about 2,000 to about 300,000 g/mole.

4. The adhesive composition of claim 1, wherein the one or more oligomers have a glass transition temperature $T_g$ of about −35° C. to about 250° C., a molecular weight less than about 100,000 g/mole, and a viscosity less than about 100,000 cps.

5. The adhesive composition of claim 1, wherein the one or more monomers have a molecular weight less than about 1000 g/mole and a viscosity less than about 100 cps.

6. The adhesive composition of claim 1, wherein the monomer component is present at a level of about 25% to about 60% by weight of the adhesive composition, the inert thermoplastic resins are present at a level up to about 30% by weight of the adhesive composition, and the oligomers are present at a level up to about 30% by weight of the adhesive composition.

7. The adhesive composition of claim 1, wherein the monomer component is present at a level of about 30% to about 50% by weight of the adhesive composition, the inert thermoplastic resins are present at a level of about 8% to about 20% by weight of the adhesive composition, and the oligomers are present at a level of about 8% to about 20% by weight of the adhesive composition.

8. The adhesive composition of claim 1, wherein the one or more oligomers are selected from the group consisting of epoxy (meth)acrylate, polyester (meth)acrylate, polyether (meth)acrylate, polyurethane (meth)acrylate, and a combination thereof.

9. The adhesive composition of claim 1, wherein the one or more free-radical curing monofunctional monomers are selected from the group consisting of aliphatic mono(meth)acrylate, aromatic mono(meth)acrylate, alkoxylated (meth)acrylate, tetrahydrofurfuryl (meth)acrylate, alkoxylated tetrahydrofurfuryl (meth)acrylate, mono-acrylic, N-vinyl compound, acrylamide compound, and a combination thereof.

10. The adhesive composition of claim 1, wherein the one or more free-radical curing monofunctional monomers comprise isobornyl acrylate, T-butyl cyclohexyl acrylate, or a combination thereof.

11. The adhesive composition of claim 1, wherein the one or more inert thermoplastic resins are selected from the group consisting of methacrylic resins, acrylic resins, methacrylate resins, aldehyde resins, and a combination thereof.

12. The adhesive composition of claim 1, wherein the one or more oligomers is a polyurethane (meth)acrylate.

13. The adhesive composition of claim 1, wherein the one or more functional additives are selected from the group consisting of a photoinitiator, a synergist, a polymerization inhibitor, a stabilizer, a wetting/flow agent, a de-aerator, a defoamer, a wax, and a combination thereof.

14. The adhesive composition of claim 1, wherein the one or more inert thermoplastic resins and one or more oligomers have a glass transition temperature $T_g$ within 40% of the glass transition temperature of the one or more free-radical curing monofunctional monomers.

15. The adhesive composition of claim 1, wherein the one or more inert thermoplastic resins and one or more oligomers are selected to achieve, in combination with the other ingredients of the composition, a glass transition temperature $T_g$ of the composition in the range of about 20° C. to about 100° C.

16. The adhesive composition of claim 1, wherein the oligomer/resin component comprises a combination of one or more oligomers and one or more inert thermoplastic resins.

17. The adhesive composition of claim 1, having a surface tension at 25° C. from about 22 mN/m to about 34 mN/m.

18. The adhesive composition of claim 1, having a viscosity at 25° C. between about 100 cps and about 3000 cps.

* * * * *